United States Patent
Wise et al.

(10) Patent No.: US 7,251,258 B2
(45) Date of Patent: Jul. 31, 2007

(54) FEMTOSECOND YTTERBIUM FIBER LASER WITH PHOTONIC CRYSTAL FIBER FOR DISPERSION CONTROL

(75) Inventors: Frank W. Wise, Ithaca, NY (US); Fatih Omer Ilday, Ithaca, NY (US); Hyungsik Lim, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 188 days.

(21) Appl. No.: 10/423,932

(22) Filed: Apr. 28, 2003

(65) Prior Publication Data
US 2004/0114641 A1    Jun. 17, 2004

Related U.S. Application Data

(60) Provisional application No. 60/432,676, filed on Dec. 12, 2002.

(51) Int. Cl.
*H01S 3/30* (2006.01)
*H01S 3/098* (2006.01)
*H01S 3/10* (2006.01)
*H01S 3/083* (2006.01)

(52) U.S. Cl. ............... 372/6; 372/18; 372/27; 372/94

(58) Field of Classification Search ............ 372/6, 372/18, 27, 94

See application file for complete search history.

(56) References Cited

U.S. PATENT DOCUMENTS

| 4,685,107 | A | * | 8/1987 | Kafka et al. | 372/6 |
| 4,835,778 | A | * | 5/1989 | Kafka et al. | 372/6 |
| 5,185,750 | A | * | 2/1993 | Kafka et al. | 372/18 |
| 5,469,455 | A | * | 11/1995 | Reitz et al. | 372/20 |
| 5,513,194 | A | * | 4/1996 | Tamura et al. | 372/6 |
| 5,592,500 | A | * | 1/1997 | Shirasaki | 372/26 |
| 5,617,434 | A | * | 4/1997 | Tamura et al. | 372/6 |
| 5,828,682 | A | * | 10/1998 | Moores | 372/26 |
| 6,813,429 | B2 | * | 11/2004 | Price et al. | 385/125 |
| 6,825,974 | B2 | * | 11/2004 | Kliner et al. | 359/341.1 |
| 2002/0168161 | A1 | * | 11/2002 | Price et al. | 385/123 |
| 2004/0258353 | A1 | * | 12/2004 | Gluckstad et al. | 385/28 |

FOREIGN PATENT DOCUMENTS

WO    WO 02084821 A2 * 10/2002

OTHER PUBLICATIONS

A Tunable, Femtosecond Pulse Source Operating in the Range 1.06-1.33 microns Based on an Yb Doped Holey Fiber Amplifier, Price, Furusawa, et al., CLEO, CPD1-1 and CPD1-2 (2001).*

(Continued)

*Primary Examiner*—Minsun Oh Harvey
*Assistant Examiner*—Hrayr A. Sayadian
(74) *Attorney, Agent, or Firm*—Jones, Tullar & Cooper, P.C.

(57) ABSTRACT

A photonic-crystal fiber provides dispersion compensation in a soliton fiber laser. The anomalous dispersion provided by the photonic-crystal fiber permits construction of a femtosecond fiber laser at 1 μm wavelength without prisms or diffraction gratings. The laser produces ~100-fs pulses with 1 nJ energy, and is a major step toward environmentally-stable all-fiber devices at 1 μm.

15 Claims, 4 Drawing Sheets

OTHER PUBLICATIONS

K. Furusawa, T.M. Monro, P. Petropoulos, D.J. Richardson; Modelocked laser based on ytterbium doped holy fiber; Electron Lett 27, (2001).

H.A. Haus, J.G. Fujimoto, E.P. Ippen; Analytic theory of additive pulse and Kerr lens mode locking; IEEE J. Quantum Electron 28, 2086-2096 (1992).

T. Brabec, CH. Spielmann, K. Krausz; Model locking in solitary lasers; Opt. Lett. 16, 1961-1963 (1991).

I.N. Duling III, Supicosecond all-fiber erbium laser; Electron Lett. 27, 544-545 (1991).

K. Tamura, E.P. Ippen, H.A. Haus, L.E. Nelson; 77-fs pulse generation from a stretched pulse mode-locked all-fiber ring laser; Opt Lett 18, 1080-1082 (1993).

H. Lim, F.O. Ilday, F.W. Wise; Generation of 2-nJ pulses from a femtosecond Yb fiber laser submitted to Opt Lett.

V. Cautaerts, D.J. Richardson, R. Paschotta, D.C. Hanna; Stretched pulse Y b3+silica fiber laser; Opt Lett 22, 316-318 (1997).

L. Lefort, J.H.V. Price, D.J. Richardson, G.J. Spuhler, R. Paschotta, U. Keller, A.R. Fry, J. Weston; Practical low-noise stretched-pulse Y b3+doped fiber laser; Opt Lett 27, 291-293 (2002).

J. Limpert, A. Liem, T. Gabler, H. Zellmer, A. Tunermann, S. Unger, S. Jetschke, H.R. Muller; High-average-power picosecond Yb-doped fiber; Opt Lett 24, 1428-1430 (1999).

M.E. Fermann, A. Galvanauskas, M.L. Stock, K.K. Wong, D. Harter; Ultrawide tunable Er soliton fiber laser amplified in Yb-doped fiber; Opt Lett 24, 1428-1430 (1999).

J.C. Knight, T.A. Birks, P. ST. J. Russel, D.M. Atkin; All-silica single-mode fiber with photonic crystal cladding; Opt Lett 21, 1547-1549 (1996).

D. Mogilevtsev, T.A. Birks, P. ST. J. Russell, Group-velocity dispersion in photonic crystal fibers; Opt Lett 23, 1662-1664 (1998).

S.M.J. Kelly; Characteristic sideband instability of periodically amplified average soliton; Electron Lett 28, 806-807 (1992).

W.J. Wadsworth, J.C. Knight, W.H. Reeves, P.ST.J. Russell, J. Arriaga; Y b3+doped photonic crystal fibre laser; Electron Lett 36, 1452-1453 (2000).

* cited by examiner

FIG. 1

FIG. 2
Pulse train

FEMTOSECOND YTTERBIUM FIBER LASER WITH PHOTONIC CRYSTAL FIBER FOR DISPERSION CONTROL

This application claims the benefit of U.S. provisional Application No. 60/432,676, filed Dec. 12, 2002, the disclosure of which is hereby incorporated herein by reference.

This work was supported by the National Institutes of Health, under grant RR 10075. The government may have rights in the invention.

BACKGROUND OF THE INVENTION

The present invention relates, in general, to short-pulse fiber lasers, and more particularly to femtosecond pulse fiber lasers operable at wavelengths of less than about 1.3 microns.

Femtosecond-pulse fiber lasers require anomalous dispersion wherein different wavelengths propagate at different speeds along the fiber, to compensate for the nonlinearities that most materials exhibit. Femtosecond erbium-doped fiber lasers operating at a wavelength of 1.55 μm can be constructed entirely of anomalous-GVD fiber to operate in the soliton regime, or with segments of normal-GVD and anomalous-GVD fiber to operate in the stretched-pulse regime. Ordinarily, however, dispersion in standard silica optical fibers is normal for wavelengths of less than ~1.3 microns and, in contrast to the situation at 1.55 microns. Thus, it has not been possible to build a femtosecond laser that emits light at a wavelength of about 1 micron with standard fibers alone. Anomalous dispersion has been obtained in fiber lasers by the use of prism and grating pairs, but the unguided propagation of light through these bulk optical elements reduces the benefits of using the fiber medium.

There is great interest in the development of short-pulse fiber lasers at wavelengths below 1.3 μm, the zero-dispersion wavelength of standard silica fiber, but efforts in this direction have been hampered by the lack of a suitable anomalous-GVD fiber. In particular, ytterbium-doped fiber is attractive for high-energy, short-pulse operation, for pulses shorter than 50 fs and pulse energies up to 6 nJ can be generated with Yb fiber; however, all short-pulse Yb fiber lasers reported to date have employed prisms or diffraction gratings for anomalous GVD. Yb-doped amplifiers provide the highest pulse energies and average powers available from fiber-based sources, but these are all seeded by bulk oscillators or complicated multi-stage fiber sources with nonlinear wavelength conversions. For greatest utility it would be highly desirable to seed these amplifiers with an integrated fiber source.

Recently-developed microstructure fibers (which are also referred to in the literature as "holey fibers" and "photonic crystal fibers" (PCF)) can be designed to have a large anomalous waveguide dispersion which is a consequence of a small effective core area (the diameter is 1-2 microns) and large index contrast. The small area produces an effectively large nonlinearity, which can be advantageous or deleterious in femtosecond-pulse fiber lasers. Similar properties can be obtained by simply tapering an ordinary fiber to the same diameter; however, the length of the resulting taper is limited to ~20 cm, and such tapered fibers are not commercially available.

It has been suggested that the anomalous dispersion in a PCF fiber could be exploited to construct modelocked lasers at wavelengths less than 1.3 microns; however, implementation of a femtosecond-pulse laser is far from obvious, owing to the properties of PCF. First, the large effective nonlinearity that inevitably accompanies anomalous dispersion is an issue, for although nonlinearity is essential for pulse formation, excessive nonlinearity also limits stable pulse formation in short-pulse fiber lasers. There is a window of stable pulse energies between these limits, but there is no guarantee that the window will be large enough to produce a practically-stable laser. A second issue is the fact that PCF fibers with anomalous dispersion are highly birefringent. This means that, in general, a pulse launched into such a PCF will be split into two components along orthogonal polarization axes. This splitting is undesirable because the two pulses may compete with each other, and thereby destabilize the laser. If the entire laser could be made of highly-birefringent fiber, it should be possible to avoid this splitting, for the pulse could propagate around the laser cavity as a single polarization component. However, highly-birefringent fiber doped with ytterbium or neodymium ions (which provide gain in the laser) is not commercially available. Accordingly, ordinary, low-birefringence fiber must be used, and it is the mixing of low- and high-birefringence that causes problems.

Although there has been a strong and clear motivation to develop all-fiber lasers at wavelengths other than 1.55 microns, the fact that there was no report of a femtosecond fiber laser with PCF for anomalous dispersion in the past four years is strong evidence of the difficulty of such an undertaking.

SUMMARY OF THE INVENTION

Briefly, the present invention relates to a soliton fiber laser which exploits photonic crystal fibers (PCF) for dispersion control. Photonic crystal fiber is silica fiber with an ordered array of air holes along its length. The novel properties of PCF include the possibility of anomalous group-velocity dispersion (GVD) at wavelengths between 0.7 and 1.3 μm, determined primarily by the core diameter and by the air-filling fraction. PCF thus offers a route to the construction of soliton fiber lasers at wavelengths below 1.3 μm. In accordance with the present invention, a fiber laser is comprised of segments of normal-GVD gain Yb fiber and anomalous-GVD photonic crystal fiber connected to form a ring cavity. The laser generates positively-chirped pulses with 1 nJ energy, which are compressed to ~100 fs with a grating pair external to the cavity. Optimization of this initial device for improved performance and environmental stability, as described herein, results in a femtosecond pulse fiber laser capable of operating at a wavelength of less than about 1.3 micron, and preferably at a wavelength of about 1.0 micron.

Short-pulse fiber lasers as described herein offer a number of practical advantages over bulk solid-state lasers, including compact size and freedom from misalignment. These attributes derive from the availability of fiber having an anomalous group-velocity dispersion, for because of the usual soliton-like pulse formation in femtosecond mod-elocked lasers, anomalous GVD is needed to balance the positive Kerr nonlinearity of the fiber.

The 1 micron output of the present femtosecond laser may be used directly in some scientific applications such as time-resolved spectroscopy, multi-photon microscopy, and optical coherence tomography. Many more applications, which may require amplification of the pulses from this laser, include precision micro-machining and corneal surgery. There is currently much interest in the development of high-average-power and high-pulse-energy amplifiers based on ytterbium-doped fiber. Remarkably, these amplifiers have demonstrated much higher average powers (up to ~100 W) than femtosecond sources based on bulk gain media. All of these amplifiers require an original source of high-quality pulses to be amplified. The laser described here is the only "all-fiber" source of femtosecond pulses at 1 micron wavelength. An amplifier is only as good as its first stage, and the simplicity, stability and reliability of the subject invention will exceed those of any other femtosecond source demonstrated to date. Thus, it is expected that the ytterbium laser described herein ultimately will find wide application in amplifier systems.

Other embodiments of the above-described laser may be utilized to enhance its performance. For example, the preferred form of the laser as described herein contains several bulk optical components, including wave plates and a beam splitter, cube. In principle, these could all be replaced with fiberized components to produce a laser in which the propagating light literally never leaves the fiber. Output from such a laser would be via a wavelength-division multiplexing coupler, which is a piece of fiber spliced onto a segment of the laser.

A PCF doped with rare-earth ions such as ytterbium would allow construction of a laser entirely of one kind of fiber, and would allow some simplification that could be valuable in some applications. Such a laser may generate longer pulses of lower energy than the current version, and its output would likely require amplification for most applications. A ytterbium-doped PCF would provide gain, nonlinearity, and anomalous dispersion, which are the main elements of a mode-locked laser.

A Yb fiber laser with a PCF for dispersion control is conceptually the 1-μm analog of existing Er fiber lasers at 1.55 μm. Dispersive and nonlinear effects dominate the dynamics of pulsed operation in the femtosecond domain. The choice of cavity parameters is guided by consideration of prior Er and Yb fiber lasers, and refined by numerical simulations of modelocking. Several issues arise in the use of PCF in soliton fiber lasers. In contrast to a laser with prisms or diffraction gratings, a laser with a PCF can experience strong nonlinear effects in the anomalous-GVD segment of the cavity. Increased nonlinearity is desirable as a facilitator of modelocking. On the other hand, strong nonlinearity, particularly in combination with anomalous GVD, will degrade the pulse quality and limit the maximum pulse energy. A practical issue is that all PCF with small core size is highly birefringent (the beat length is a few mm).

The large birefringence of PCF, which was described above as a problem to be addressed, can be exploited in the construction of environmentally-stable lasers, which are relatively unaffected by ambient conditions, such as temperature variations, physical contact, or motion of the fibers. Fibers with large birefringence are referred to as "polarization-maintaining" (PM) because a linearly-polarized field propagates through the fiber with fixed polarization direction, and a laser constructed of such a fiber will be insensitive to perturbations from the environment. A ytterbium-doped PCF with a small core area can provide anomalous dispersion at 1 micron in a PM fiber. Thus, an environmentally-stable laser could be constructed. An alternative approach would be to use a segment of normal-dispersion gain fiber that is polarization maintaining along with the anomalous-dispersion PCF.

Amplitude modulation is required to initiate and stabilize the pulses in a modelocked laser, and this is provided by the process of nonlinear polarization evolution (NPE) in most fiber lasers, including the present laser utilizing PCF.

BRIEF DESCRIPTION OF THE DRAWINGS

The foregoing and additional objects, features and advantages of the invention will become apparent to those of skill in the art from the following detailed description of preferred embodiments, taken with the accompanying drawings, in which:

FIGS. 3(*a*) and 3(*b*)-3(*c*) illustrate the autocorrelation of the pulses from the Yb fiber laser, recorded over the indicated ranges of delay;

FIG. 3(*c*) illustrates measured interferometric autocorrelation (points) and envelopes calculated from the measured power spectrum; and FIGS. 4(*a*) and 4(*b*) illustrate the spectrum of the laser output on linear and logarithmic scales, respectively.

DESCRIPTION OF PREFERRED EMBODIMENTS

Figure 1:
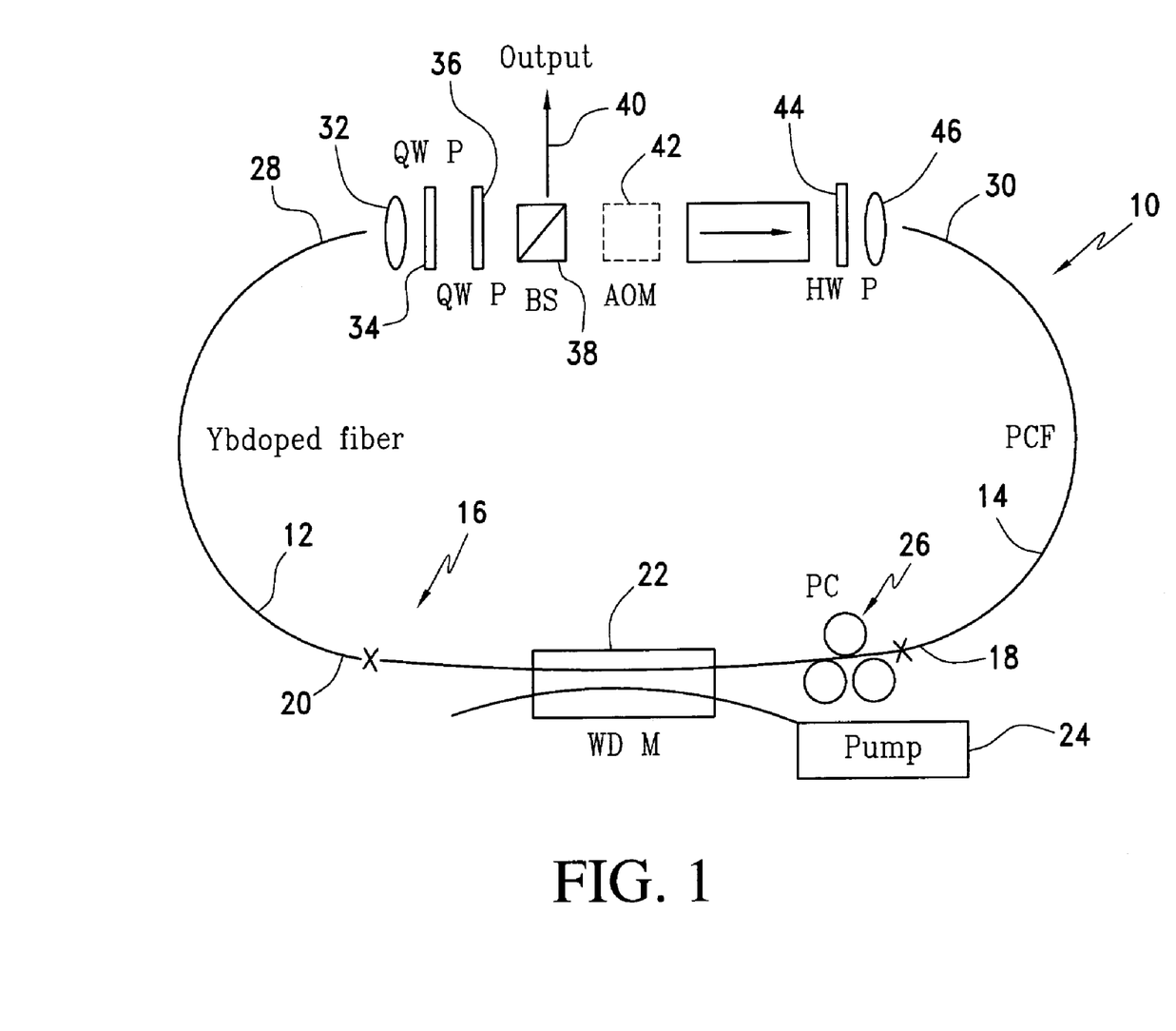
FIG. 1. is a schematic diagram of a laser fabricated in accordance with the present invention, utilizing a Yb fiber and a PCF fiber, a quarter-wave plate (QWP), a half-wave plate (HWP), a polarizing beam splitter (BS), a polarization controller (PC), and an isolator.

Turning now to a more detailed description of a preferred embodiment of the present invention, a femtosecond pulse soliton fiber laser 10 is illustrated in FIG. 1 as including a Yb doped optical fiber 12 and a photonic crystal fiber (PCF) 14 interconnected to form a unidirectional ring cavity 16.

In one version of the invention, the Yb fiber 12 was 20 cm in length, had a core diameter of 6 μm, an NA=0.12, and had 23,600 ppm doping, while the PCF fiber (supplied by Crystal-Fibre A/S) had a length of 1.3 m, a core diameter of 2 μm, a 1.4 μm pitch, and a 0.7 average pitch-to-hole-size ratio, and was selected to have substantial anomalous group velocity dispersion (about −40 ps/km) at 1 μm ps$^2$/km.

A first end 18 of PCF fiber 14 was connected to a first end 20 of the Yb fiber 12 through a wavelength division multiplexed (WDM) coupler 22, which enabled the Yb fiber to be pumped at 980 nm by a laser diode pump 24 capable of supplying up to 500 nW into the single mode fiber 12. An in-line polarization controller (PC) 26 was connected between the end 18 of fiber 14 and the WDM coupler 22 to convert the light propagated in the cavity to elliptically polarized light.

A second end 28 of fiber 12 is connected to a second end 30 of fiber 14 through a coupler 32, first and second quarter wave plates (QWP) 34 and 36, through a beam splitter (BS) 38 having an output 40, through an acousto-optic modelocker (AOM) 42, and through a half-wave plate (HWP) 44, and through a coupler 46. The PCF fiber 14 is located in a segment of the resulting ring cavity 16 where linear polarization is maintained, with the polarization controller being provided to allow nonlinear polarization evolution (NPE) to occur as an effective saturable absorber, to start and stabilize mode-locking in the cavity.

The fiber 12, which is the gain fiber in the ring laser, has a normal group velocity dispersion, while the PCF fiber 14 has anomalous group velocity dispersion. The connection of these two fibers in a ring laser enables the normal GVD of the fiber 12 to be compensated by 1.3 m of PCF fiber, resulting in a net anomalous GVD of 0.02 ps$^2$. With its relatively short fiber lengths and net anomalous dispersion, the laser operates in the weakly-stretched soliton regime. The output 40 from the laser is taken from an NPE rejection port at the beam splitter 38; the remaining light passes through the beam splitter and is directed into the PCF 14. Directing part of the pulse out of the cavity light reduces the pulse energy in the PCF 14 and the beam splitter linearly polarizes the field coupled into the PCF.

Even with the half-wave plate 44 in the cavity 16 immediately before the PCF 14, there is some residual excitation of the polarization mode orthogonal to the desired mode. In the time domain, the components of the pulse in the different modes will walk off, due to birefringence, with the result that excitation of the undesired polarization may impede self starting in the laser. The provision of the AOM 42 in the cavity permits mode-locking to be established by adjustment of the polarization controllers 26. Once mode locking is initiated, the AOM is turned off, and mode-locking is self-sustaining.

Figure 2:
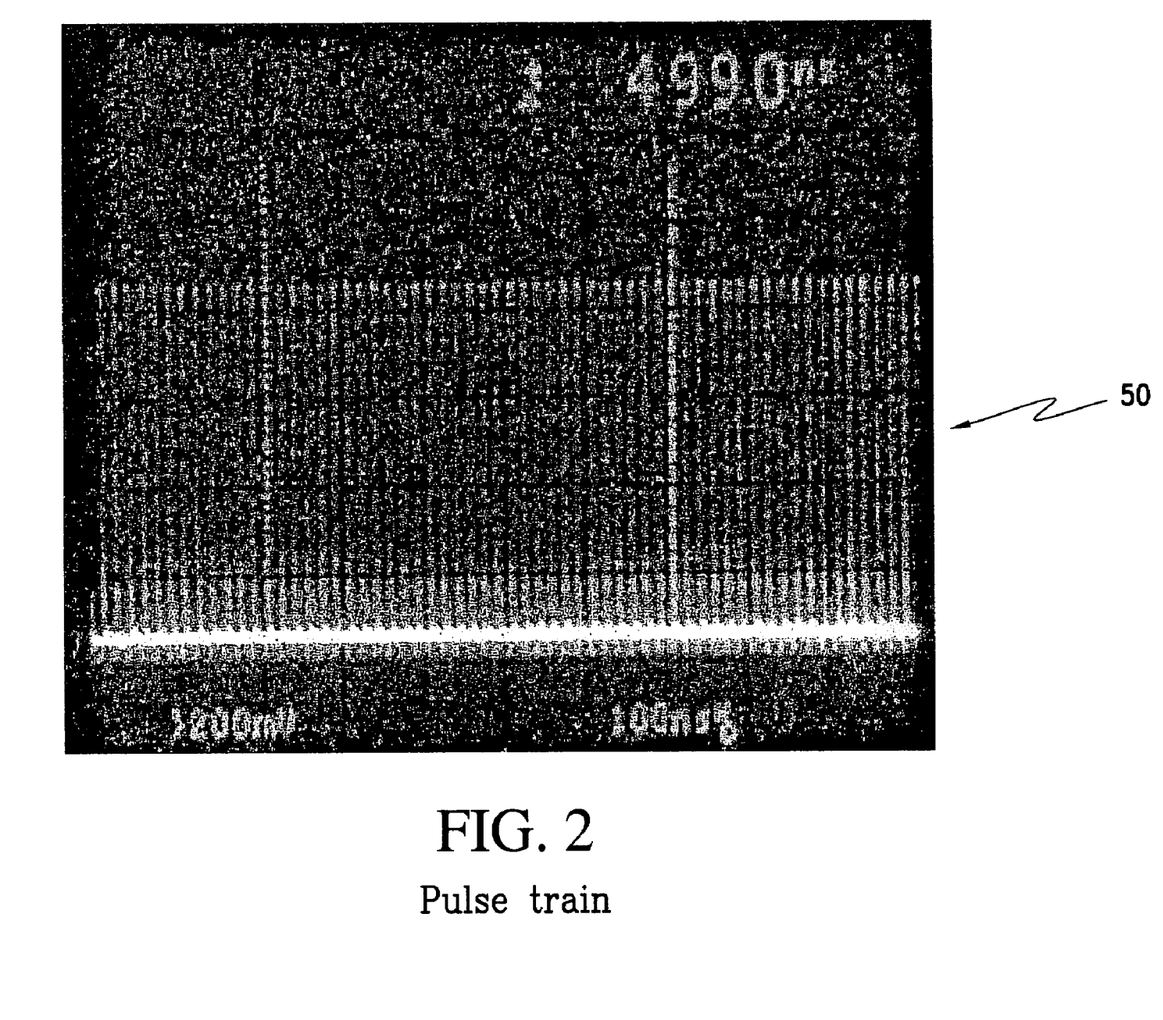
FIG. 2 illustrates a pulse train generated by the laser of FIG. 1.

FIG. 2 illustrates at 50 a pulse train of light propagating in the ring cavity 16, with the AOM turned off. The pulse train has a repetition rate of 50 Mhz and an average power of 50 mW, with a pulse energy of nJ.

A simplified model of the laser cavity was constructed to investigate the effect of birefringence on pulse start-up. Propagation in the fiber segments is described by the nonlinear Schrodinger equation that includes saturating, finite-bandwidth gain for the Yb fiber. Following the PCF, the field is split into two components corresponding to the different polarization modes. One of these is temporally delayed by a discrete amount corresponding to the fiber beat length, and the components are added together: $E(t)(1-\hat{e})+E(t+\hat{o})\hat{e}$ where $E(t)$ is the optical field, $\hat{e}$ is the coupling coefficient into the undesired mode, and $\hat{o}$ is the delay. Numerical simulations of this model show that for a given pulse energy, the time required for modelocking to develop is linearly proportional to $\hat{e}$ below a threshold value. For stronger coupling, stable modelocking cannot be obtained unless the pulse energy is increased.

Figure 3A:
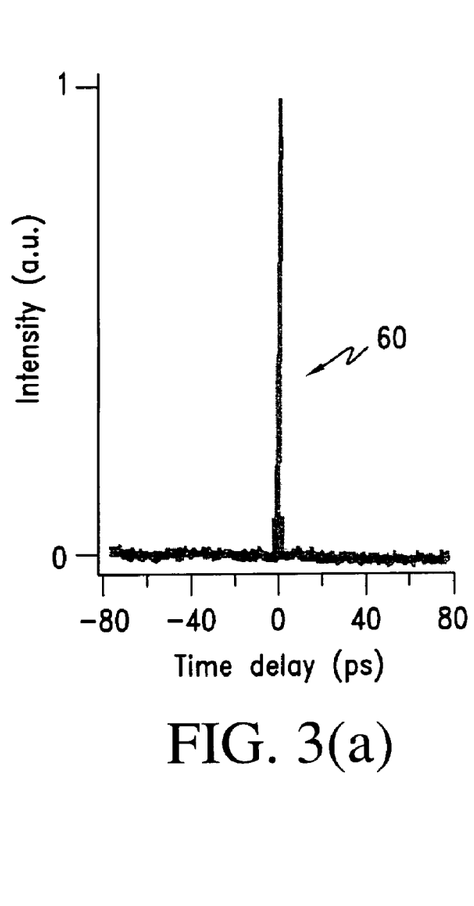
Figure 3B:
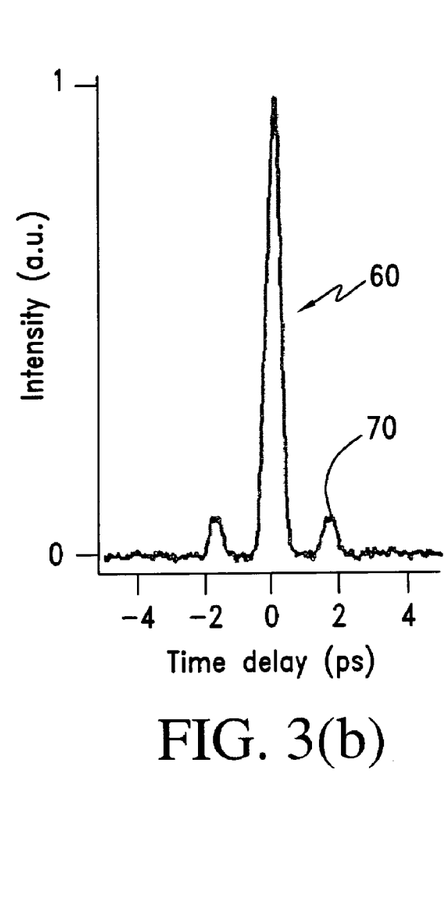
Figure 3C:
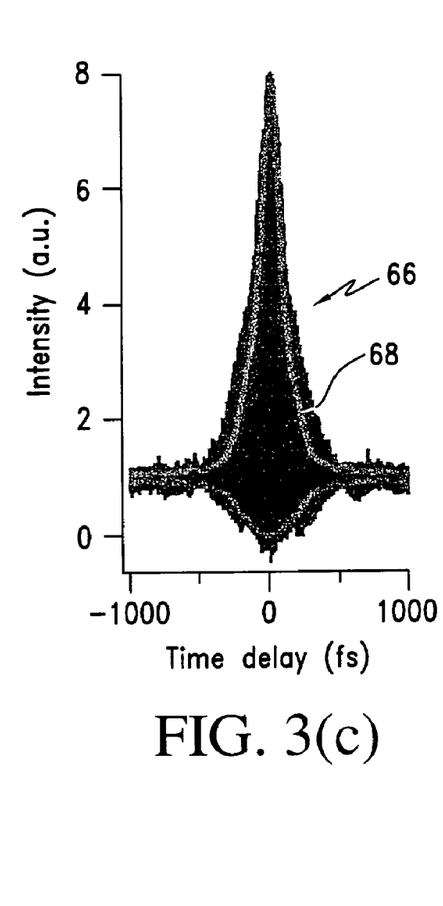
Figure 4A:
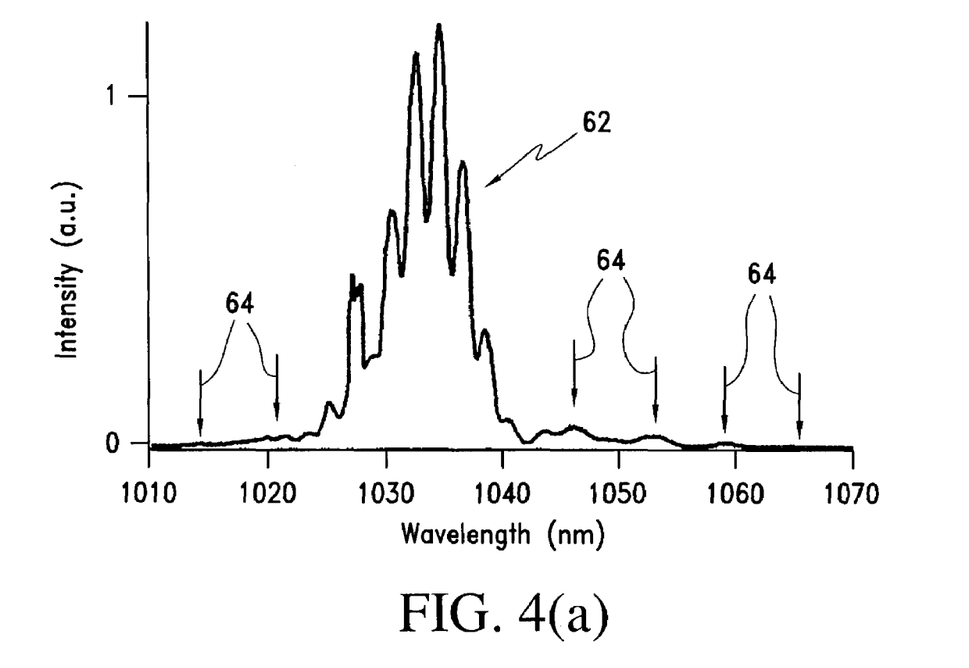
Figure 4B:
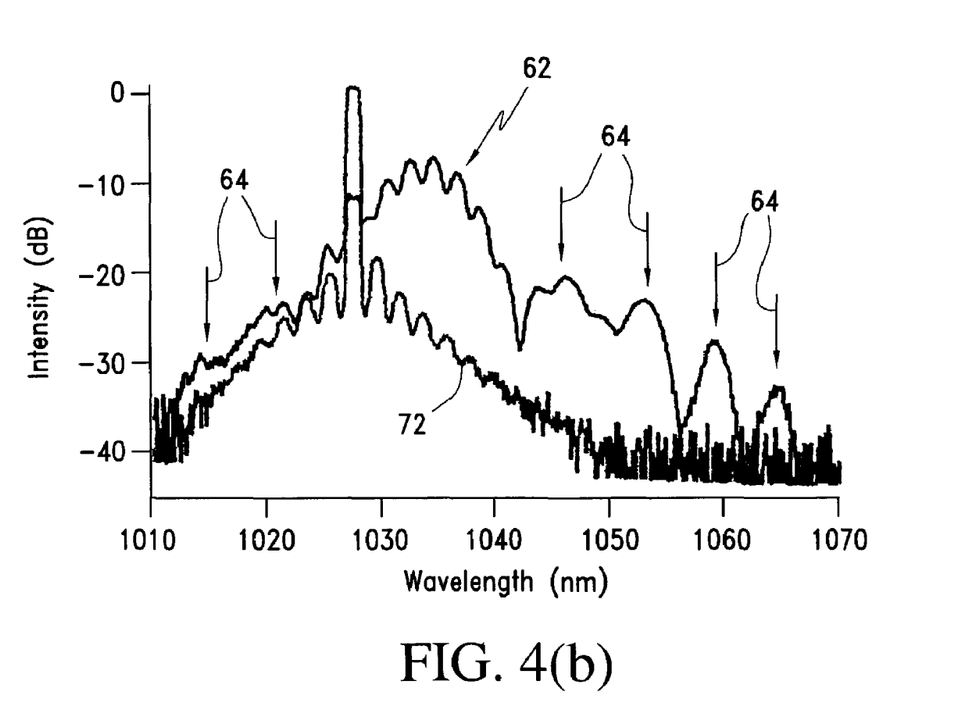

The autocorrelation 60 of output pulses from the Yb fiber 12 at output 40 is shown for two time-delay scales in FIGS. 3(*a*) and 3(*b*), and the power spectrum 62 is shown in FIG. 4. The long-range autocorrelation 60, taken over the time delays indicated in FIGS. 3(*a*) and 3(*b*), demonstrates single-soliton operation. The spectral sidebands (marked with arrows 64 in FIG. 4) provide a signature of the soliton regime, and the GVD ($-0.02$ ps$^2$) inferred from the positions of the spectral sidebands agrees with the nominal cavity GVD. The interferometric autocorrelation of the compressed pulses is shown in FIG. 3(*c*) along with the envelopes calculated from the measured power spectrum 68, assuming that the phase is constant across the spectrum. The transform-limited pulse duration would be 80 fs. The experimental autocorrelation obtained with the above-described configuration is 30% broader than the transform-limited version, so the pulse duration could not be determined precisely. However, it is reasonable to conclude that the pulse duration was in the range 100-120 fs. Directly out of the laser, the pulse duration was measured to be 300 fs. The birefringence of the PCF produced the deep modulation on the spectrum with a period of 2 nm, corresponding to 2-ps walk-off. The small secondary pulse 70 located 2 ps from the main pulse (FIG. 3(*b*)) originated in the component of the field in the undesired polarization mode of the PCF. The zero-phase Fourier transform of the mode-locked spectrum produced a secondary pulse at the same 2-ps interval, and comparison with the cw lasing spectrum 72 (also shown in FIG. 4(*b*)) confirmed that the spectral modulation and temporal location of the secondary pulse were consequences of the birefringence of the PCF. The secondary pulse contained 7% of the energy of the main pulse.

The secondary pulse was due to linear birefringence, and is distinguished from the multiple-pulsing that occurs in modelocked lasers when the pulse energy is excessive. When the pump power was increased, multiple-pulsing (most commonly double-pulsing) was observed. The pulses were separated by tens of picoseconds, with the exact separation depending on the intracavity pulse energy. Each soliton is accompanied by the small secondary pulse seen in single-soliton operation, at the same fixed separation.

Thus, there has been described an environmentally stable 1 μm soliton laser with dispersion controlled by a PCF, wherein the performance and practical advantages of all-fiber lasers at 1.55 μm are available at 1 μm. Although the invention has been described in terms of a preferred embodiment, it will be apparent that numerous modifications may be made to provide femtosecond pulses in a fiber laser at wavelengths between about 0.7 and 1.3 μm, and to provide self-starting operation. In addition, it is evident from numerical simulations that stronger pulse-stretching can be implemented for maximum pulse energy and minimum duration with outputs of several nanojoules being possible, which would match the largest pulse energy produced by a fiber laser, and be comparable to the pulse energy of a Ti:sapphire laser.

Other variations will be apparent to those of skill in the art without departing from the true spirit and scope of the invention, as set out in the following claims.

What is claimed is:

1. A femtosecond pulse fiber laser operable at a wavelength of below 1.3 microns comprising:
   at least a first segment of optical gain fiber having normal group velocity dispersion;
   at least a first segment of microstructure fiber having anomalous group velocity dispersion at wavelengths below about 1.3 microns;
   a polarization controller disposed between said optical gain fiber and said microstructure fiber for converting linearly polarized light to elliptically polarized light for allowing nonlinear polarization evolution to occur;
   means for converting said elliptically polarized light to amplitude modulation to start and stabilize mode locking of said laser; and
   means for aligning polarization of a pulse as it enters said segment of microstructure fiber with a polarization axis of said microstructure fiber.

2. The laser of claim 1, further comprising means for insuring self-starting of said laser.

3. The laser of claim 2, wherein said means for insuring self-starting comprises an acoustic optic mode locker disposed in said laser.

4. The laser of claim 1, wherein said optical gain fiber segment is formed of Yb doped fiber.

5. The laser of claim 1, wherein said microstructure fiber segment is formed from photonic crystal fiber.

6. The laser of claim 5, wherein said optical gain fiber segment is formed of Yb doped fiber.

7. The laser of claim 6, wherein said optical gain fiber segment is formed of Yb doped photonic crystal fiber.

8. The laser of claim 1, wherein said means for converting said elliptically polarized light to amplitude modulation comprises firs and second quarter wave plates and a polarization beam splitter through which light is directed after passing through said first segment of optical gain fiber.

9. The laser of claim 1, wherein said means for aligning polarization of a pulse as it enters said segment of microstructure fiber with a polarization axis of said microstructure fiber comprises a half wave plate.

10. A method of generating femtosecond pulses at a wavelength of less than 1.3 microns, comprising the steps of:
providing a normal group velocity dispersion optical gain fiber segment and an optical microstructure fiber segment having anomalous group velocity dispersion at wavelengths below about 1.3 microns in a laser cavity;
pumping said optical gain fiber segment to cause propagation of pulses of light through said gain and microstructure fiber segments;
passing linear polarized light from said optical gain fiber through a polarization controller disposed between said optical gain fiber and said microstructure fiber and thereby convening said linearly polarized light to elliptically polarized light for allowing nonlinear polarization evolution to occur;
converting said elliptically polarized light to amplitude modulation to start and stabilize mode locking of said laser; and
aligning polarization of a pulse as it enters said segment of microstructure fiber with a polarization axis of said microstructure fiber.

11. The method of claim 10, further comprising the step of passing light pulse though an acoustic optic mode locker disposed in said cavity to insure self staring of and stabilization of mode locking of said laser.

12. The method of claim 10, said step of converting said elliptically polarized light to amplitude modulation comprises passing said light through first and second quarter wave plates and a polarization beam splitter after said light passes through said first segment of optical gain fiber.

13. The method of claim 10, wherein said step of aligning polarization of a pulse as it enters said segment of microstructure fiber with a polarization axis of said microstructure fiber comprises passing said pulse through a half wave plate before entering said microstructure fiber.

14. The method of claim 10, wherein said optical gain fiber segment is selected to be made from Yb doped fiber.

15. The method of claim 14, wherein said optical gain fiber segment is selected to be made from Yb doped photonic crystal fiber.

* * * * *

UNITED STATES PATENT AND TRADEMARK OFFICE
CERTIFICATE OF CORRECTION

| | | |
|---|---|---|
| PATENT NO. | : 7,251,258 B2 | Page 1 of 1 |
| APPLICATION NO. | : 10/423932 | |
| DATED | : July 31, 2007 | |
| INVENTOR(S) | : Frank W. Wise et al. | |

It is certified that error appears in the above-identified patent and that said Letters Patent is hereby corrected as shown below:

In Col. 7, line 18
replace "convening"
with "converting."

In Col. 8, line 6
replace "staring"
with "starting."

Signed and Sealed this

Twenty-seventh Day of May, 2008

JON W. DUDAS
*Director of the United States Patent and Trademark Office*